United States Patent [19]

Maupin

[11] 4,032,239
[45] June 28, 1977

[54] SCRUBBING APPARATUS

[76] Inventor: Roger A. Maupin, 226 Blue Castle, Houston, Tex. 77015

[22] Filed: Sept. 17, 1975

[21] Appl. No.: 614,125

[52] U.S. Cl. .................................. 401/203; 15/228
[51] Int. Cl.² .......................................... A47L 1/06
[58] Field of Search .......... 401/203, 204, 266, 267, 401/289, 8, 9, 11, 196; 15/120 A, 233, 228, 229 A, 229 C

[56] References Cited

UNITED STATES PATENTS

| 1,200,602 | 10/1916 | Freud | 15/104.9 |
|---|---|---|---|
| 1,718,117 | 6/1929 | Dainos | 401/289 |
| 2,350,469 | 6/1944 | Litka | 401/289 |
| 2,682,071 | 6/1954 | Linderoth | 15/228 X |
| 2,727,268 | 12/1955 | Hucke | 15/233 X |

FOREIGN PATENTS OR APPLICATIONS

| 399,842 | 7/1924 | Germany | 15/120 A |
|---|---|---|---|
| 678,223 | 8/1952 | United Kingdom | 15/120 A |

Primary Examiner—Lawrence Charles
Attorney, Agent, or Firm—Browning, Bushman & Zamecki

[57] ABSTRACT

A scrubbing apparatus for washing, drying and/or polishing a car or other object comprises a base and a plurality of fingers adjoining the base, extending generally radially away from a centerline and also extending generally axially with respect to the centerline in a uniform direction. The fingers are flexible and resilient to accomodate the curvatures of various parts of the object being scrubbed.

5 Claims, 10 Drawing Figures

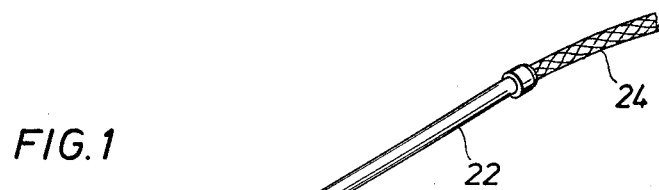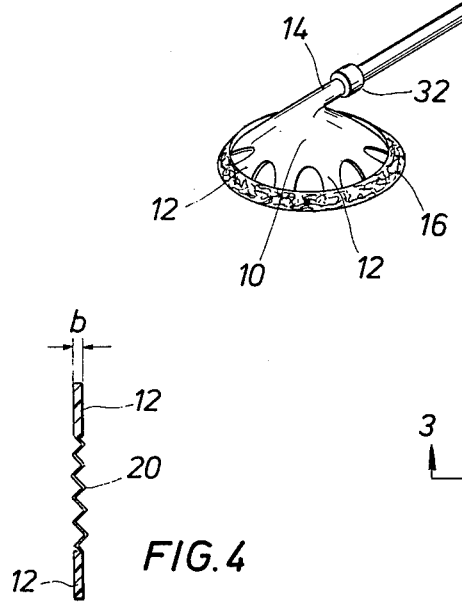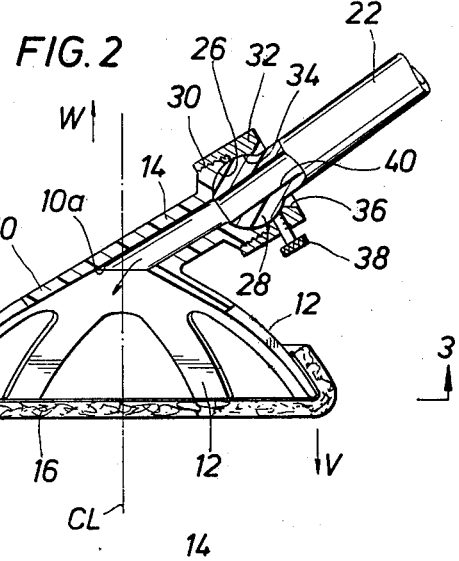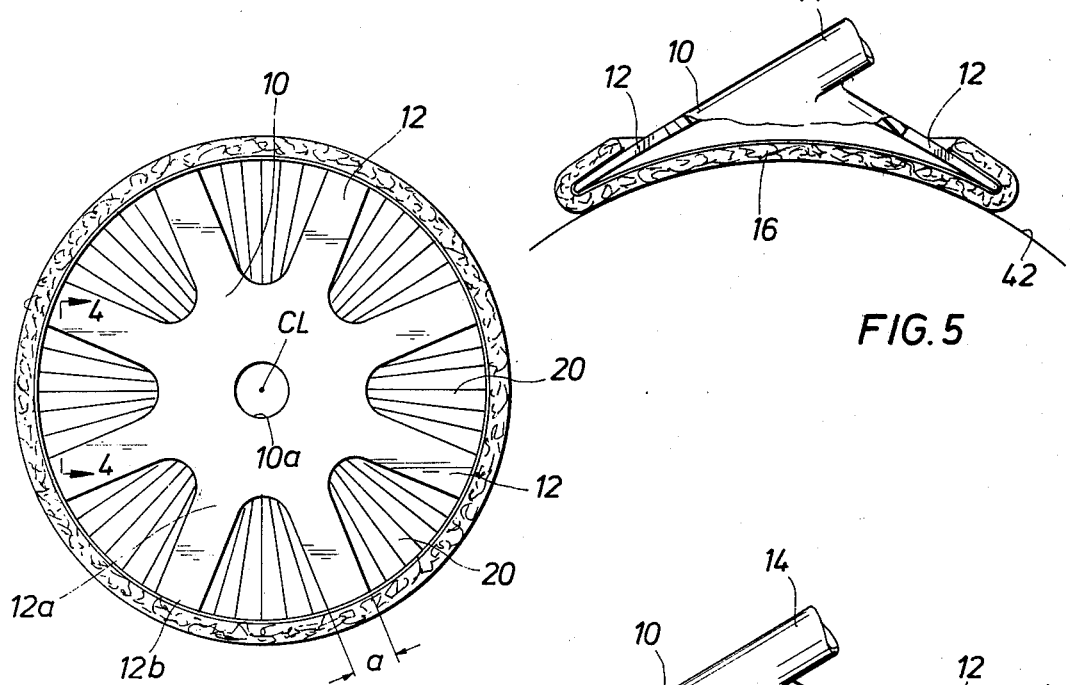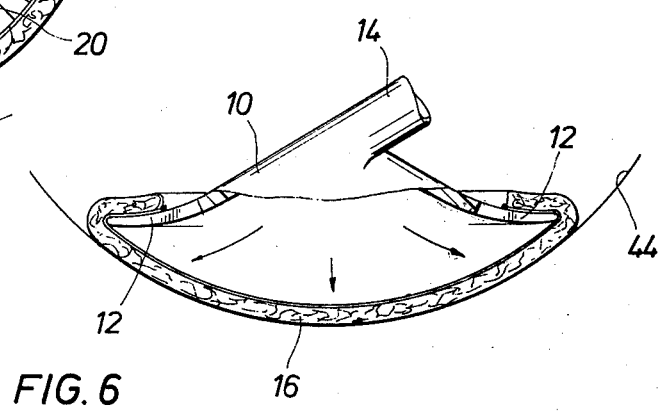

SCRUBBING APPARATUS

BACKGROUND OF THE INVENTION

1. Field of the Invention

The present invention pertains to apparatus for scrubbing an automobile or other object. As every car owner well knows, the chore of washing or waxing an automobile is an inconvenient and even irksome one. The worker generally requires a number of different pieces of equipment such as a hose, a bucket, a cloth, a chamois, etc. He is then required to work with one or more of these items in each hand and/or to repeatedly change the item with which he is working. To this inconvenience is added a great deal of stooping, bending, and stretching on his part in an effort to reach all parts of the car. The task is rarely accomplished without wetting ones clothes. Such a chore could be greatly simplified by apparatus which combines the functions of the various pieces of equipment ordinarily used and also by apparatus which allows the worker easier access to the various parts to be washed.

2. Description of the Prior Art

In the past, a number of car washing devices have been designed, but none have been entirely satisfactory or widely accepted. One of the main problems with such devices is that they do not adequately conform to the contours of the object being washed. One such device is shown in U.S. Pat. No. 2,538,542 to Tucker. This device comprises a hollow rod having one end connected to a water hose. At the other end of the rod there is mounted a disc carrying a washing material such as sheepskin.

While the disc and sheepskin can be compressed to fit into at least some crevices, it is difficult to make them conform well to many concave areas, and there is no convenient way of making the washing surface as a whole conform to the configuration of convex areas of the car. This is not only inefficient in terms of the use of water and time and energy of the worker but also conducive to skipping over various spots on the surface of the car.

Other devises, such as the disclosed in U.S. Pat. No. 1,775,235, have employed a flexible washing mop which fits over the worker's hand. Thus, the hand can be used to help the mop conform to various parts of the car. However, due to the limitations of the flexibility of the human hand, there are still a number of contours on the car's surface which the mop as a whole can not be made to fit. Then the effective scrubbing surface is only that small portion of the mop adjacent the worker's fingertips. Furthermore, the device offers no solution to the problem of washing hard to reach places. It actually offers little advantage over ordinary hand washing except that water may be supplied directly to the mop which is held in place on the worker's hand.

Thus, the need for a more effective device can readily be appreciated.

Summary of the Invention

The present invention comprises a base and a plurality of flexible resilient fingers each having a base end connected to the base and a free end. The fingers extend generally radially away from a finger centerline and also axially with respect to the centerline in a uniform direction. This uniform axial direction is generally opposite that of a handle adjoining the base. In other words, each of the fingers has both a radial and an axial component of direction, and the axial component extends in the opposite direction from the axial component of the handle. The base and the fingers together preferably define a cup-like member whose mouth opens generally away from the handle.

Adjacent ones of the fingers may be connected by web elements while a pad may be connected to the free ends of the fingers and extend across the mouth of the cup-like member. Both the web elements and the pad are preferably adapted to accomodate movement of the fingers as they are pressed toward various parts of the automobile or other object.

The handle is preferably tubular and communicates with an opening in the base to supply fluid to the interior of the cup-like member. The end of the handle distal the base is adapted for connection to a water hose or other fluid source.

The fingers are flexible and resilient, preferably in the axial directions, and thus conform more readily to the various contours of the car or other object being scrubbed than has been possible with prior devices. They therefore cause the pad which they carry to conform more closely to the contours in the same manner. Thus, the effective scrubbing surface is, in more instances, substantially the entirety of the outer side of that portion of the pad which extends across the cup-like member. Moreover, this conforming is accomplished simply by pressing the fingers toward the surface being scrubbed by means of the handle. Irregular or asymmetrical areas are readily accomodated as the fingers on one side of the device can flex more or less than those on another side, or they can even flex in different directions. At the same time, the handle may be elongated to enable the worker to more easily reach the various parts of the car.

Accordingly, it is a principle object of the present invention to provide a scrubbing apparatus having a plurality of flexible resilient fingers.

Another object of the invention is to provide a scrubbing apparatus which conforms more readily to the contours of an object being scrubbed than prior devices.

Still another object of the invention is to provide a scrubbing apparatus comprising a handle facilitating the scrubbing of hard to reach portions of an object being scrubbed while providing for conforming of the apparatus to the object by application of pressure with the handle.

Yet another object of the present invention is to provide a scrubbing apparatus having a larger effective scrubbing area while conforming to the contours of an object being scrubbed.

Other objects, features, and advantages of the present invention will be made apparent by the following description of preferred embodiments, the drawings, and the claims.

BRIEF DESCRIPTION OF THE DRAWINGS

FIG. 1 is an isometric view of a preferred embodiment of the invention.

FIG. 2 is a longitudinal cross-sectional view of a portion of the apparatus in FIG. 1.

FIG. 3 is a cross-sectional view taken on line 3—3 of FIG. 2.

FIG. 4 is a fragmentary cross-sectional view taken on lines 4—4 of FIG. 3.

FIG. 5 is a view of a portion of the apparatus of FIGS. 1–4, with parts broken away, shown conforming to a convex surface.

FIG. 6 is a view similar to that of FIG. 5 with the apparatus conforming to a concave surface.

DESCRIPTION OF THE PREFERRED EMBODIMENTS

Figure 7:
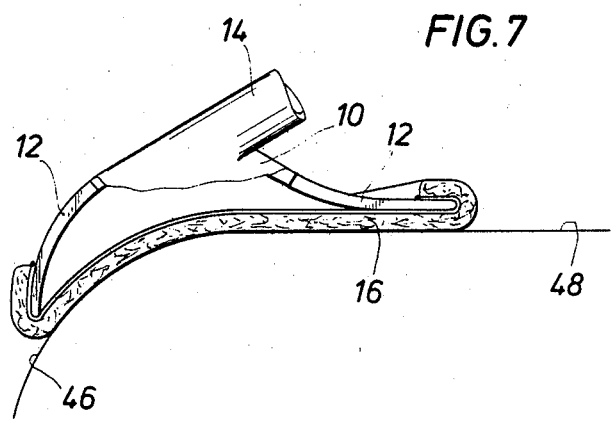
FIG. 7 is a view similar to that of FIGS. 5 and 6 with the apparatus conforming to an irregular surface.
Figure 8:
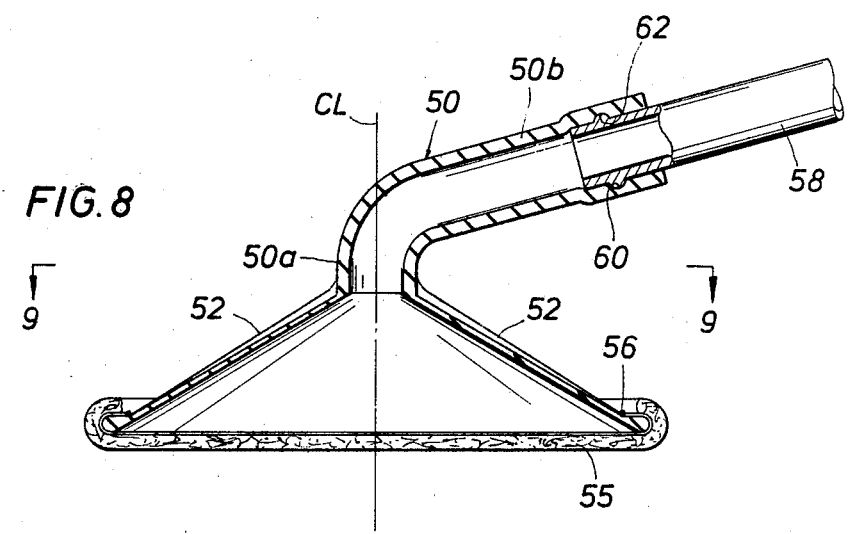
FIG. 8 is a longitudinal cross-sectional view of a second embodiment of the invention.
Figure 9:
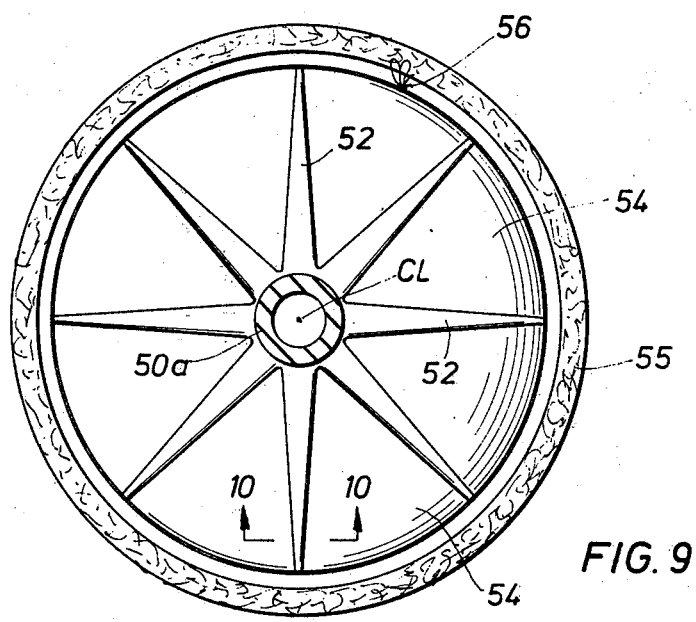
FIG. 9 is a view taken on lines 9—9 of FIG. 8.
Figure 10:
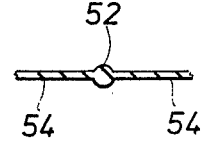
FIG. 10 is a fragmentary cross-sectional view taken on lines 10—10 of FIG. 9.

Referring to the drawings, FIGS. 1–7 show a first embodiment of the invention and FIGS. 8—10 another embodiment. While these embodiments will be described herein in connection with car washing, it will be appreciated that, with suitable material for the pad, the apparatus could also be used for drying, waxing, polishing, and various other tasks involving a scrubbing-type action. Similarly, it will be appreciated that the invention could be used on numerous objects other than automobiles.

Referring now to FIGS. 1–4, the scrubbing apparatus comprises a generally conical base 10. A plurality of spatulate fingers 12 are integral with and depend from the wide end of the base 10. Each finger 12 has a base end 12a adjoining the base 10 and a free end 12b spaced from the base 10. The fingers are orientated with respect to a finger centerline CL. In particular, the fingers extend radially away from the centerline CL and also extend axially with respect to the centerline CL in a uniform direction. In other words, each finger has both a radial and an axial component of direction with respect to centerline CL, and the axial components, from base ends 12a to free ends 12b, are all in the same direction, i.e. the direction of arrow V. Thus, the fingers 12 and the base 10 together define a generally cup-like member. At this point it is noted that the term cup-like, used herein, does not necessarily refer to a solid structure, but to the general profile of the member as a whole regardless of breaks such as the spaces between the fingers. Furthermore, it should be noted that the cup-like configuration can be generally conical, curved, or a combination of the two.

In the preferred embodiment shown, the finger centerline CL is also the longitudinal centerline of the conical base 10. The base 10 has an aperture 10a at its small end on the centerline CL. A tubular extension 14 integral with the base 10 communicates with the aperture 10a and thus with the interior of the cup-like member formed by the base 10 and fingers 12. Tubular extension 14 depends from base 10 at an angle with respect to centerline CL, and its axial component of direction, from the base 10 outwardly, is generally opposite those of the fingers 12, i.e. parallel to arrow W.

As best seen in FIG. 2, the fingers 12 are slightly curved so as to be concave in the same general direction as the cup-like member as a whole. The fingers 12 are flexible and resilient, particularly in the axial direction. As shown, the entire structure 10, 12, 14 is integrally molded of plastic, fiberglass, metal, or other suitable material. The fingers 12 have a relatively large width (see arrows a in FIG. 3) and a relatively small thickness (see arrows b in FIG. 4). If desired, the fingers 12, when formed of plastic or the like, may be reinforced with spring metal to enhance their flexibility and resiliency.

A porous pad 16 extends across the mouth of the cup-like member formed by the free ends 12b of the fingers 12 and thence radially inwardly along the outer surfaces of the fingers 12. Pad 16 is comprised of a relatively rough-textured scrubbing layer 16a and a smoother backing 16b, each of which is porous and elastic. The pad is removably held in place by a cord 18, which may be elastic, a non-elastic drawstring, etc. As shown, the pad 16 is sufficiently elastic to accomodate the maximum flexing of the fingers 12 as the flex to conform to the concave contours of the car being washed. The elasticity of the pad may be inherent in the pad material, or the construction of the pad, e.g. knitted, may provided the necessary elasticity. Alternatively, the pad may be inelastic but sufficiently full to accomodate, without stretching, the maximum flexing of the fingers 12, in which case the pad 16 will hang loosely across the mouth of the cup-like member when the fingers 12 are in their relaxed position.

An expandible web element 20 of plastic or other impervious material is disposed between each two adjacent finger 12 and connected to its respective fingers 12 so as to seal the area between them. The web elements 20 are expandible in that they are sufficiently full to accomodate the maximum distension of the fingers 12. As shown in FIG. 3, the web elements 20 are pleated in a generally radial direction with respect to centerline CL to take up the excess fullness when the fingers 12 relax. Alternatively, the web elements 20 may be formed of elastic material.

Tubular extension 14 forms a part of the handle of the scrubbing apparatus. The outer part of the handle is formed by a rigid tubular wand 22. Wand 22 has one end connected to tubular extension 14 distal base 10 by a ball and socket connection and the other end adapted in the usual manner for connection to a water hose 24 or other source of fluid. The ball and socket connection permits both rotative and angular adjustment of the base 10 and attached fingers and pad with respect to the wand 22. As shown, the end of the tubular extension 14 distal the base 10 is enlarged and externally threaded and has formed therein a semi-spherical portion 26. A ball 28 is formed on the end of the wand 22 which is to be attached to tubular extension 14. The ball 28 is placed in socket 26 and a nut 32 is slipped over the wand 22 from the opposite end and threadedly connected to the tubular extension 14 at 30. Nut 32 has a partial spherical internal portion 34 which cooperates with portion 26 to form a socket rotatably retaining ball 28. Outboard of portion 34, the internal surface of nut 32 is bevelled outwardly at 36 to allow angular movement of tubular extension 14 and nut 32 with respect to wand 22. The angle of bevel 36 is such as to provide a stop cooperative with wand 22 to prevent too great an angular movement such as would place the bore of wand 22 out of communication with the bore of tubular extension 14. Thus, extension 14 and wand 22 form a tube having a flowway 40 and water is continuously permitted to flow through wand 22 to tubular extension 14 and the interior of the cup-like member 10, 12 while swivelling movement is also allowed. A screw 38 extends through a suitable bore in nut 32 transverse to the axis of the nut and may be tightened to lock the base 10 in a desired position wth respect to the wand.

In use, water flows through the flowway 40 to the interior of the cup-like member 10, 12. The water saturates the pad 16 and passes therethrough to wet the surface of the car being washed. As the worker presses the base 10, the fingers 12 and the pad 16 toward this car surface with the wand 22, the various contours and angles of the surface are accomodated by the flexing of fingers 12 and by the swivelling of the cup-like member 10, 12 and extension 14 on the ball and socket connection.

FIGS. 5-7 show the manner in which the flexible fingers 12 accomodate various types of surfaces thereby causing the pad 16 to conform to these surfaces. In FIG. 5 there is shown a convex surface 42 whose radius of curvature is greater than that of fingers 12 in the relaxed state (shown in FIG. 2). As the device is pressed against such a surface, pressure is first exerted against the free ends 12b of the fingers 12. The fingers gradually straighten out as shown in FIG. 5 to more closely conform to the configuration of surface 42. Pad 16 is accordingly stretched over surface 42 and caused to conform to this surface over substantially the entire area encompassed by the free ends of 12b of the fingers 12. Thus, a relatively broad effective scrubbing surface conforming to surface 42 is provided by the pad. The relatively wide fingers 12 provide a substantial backing for the pad 16, and the web elements 20 also help to back the pad.

Turning now to FIG. 6, there is shown a concave surface 44. As the scrubbing apparatus is pressed against this surface, the fingers 12 not only straighten but reverse their direction of concavity so that the pad 16 may more nearly conform to the configuration of surface 44 as shown. When the pressure on wand 22 is released, the resilient fingers 12 return to their relaxed position.

FIG. 7 shows the manner in which the fingers may flex to allow the pad to conform to a convex surface having a smaller radius of convature than the fingers themselves and also demonstrates the manner in which the fingers on different sides of the device may flex in different ways to accomodate an irregular surface. The surface shown in FIG. 7 has one convex portion 46 having a smaller radius of curvature than the fingers 12 in their relaxed state. Adjacent to portion 46 is a substantially straight portion 48. As the device is pressed against the surface 46, 48, the fingers 12 on the right in FIG. 7 straighten out as shown to accomodate straight portion 48 of the surface and cause the right side of the pad 16 to conform to this portion of the surface. As the pad 16 contacts and is stretched over the portion 46 of the surface, it tends to pull the free ends of the fingers 12 on the left side down against the surface 46 so that, once again, the pad 16 conforms to the surface 46, 48 over substantially the entire area circumscribed by the free ends 12b of the fingers 12.

It will be appreciated that the fingers 12 can flex to accomodate an infinite number of contours. To scrub a small concave area or crevice, the base may be turned sideways and the free ends 12b of some of the fingers 12 and the adjacent portion of the pad 16 may be worked into the area to scrub it.

It will be appreciated that the pad 16 may be removed for cleaning, for permanent replacement when worn, or for temporary replacement by another type of pad, such as chamois, so that the device may be used for another type of operation such as drying, waxing, etc. At such time, the device can be disconnected from the water hose 24.

FIGS. 8-10 illustrate another embodiment of the invention. The device of FIGS. 8-10 comprises a bent tube 50 of relatively hard rubber or the like having one leg 50a aligned with a finger centerline CL to form the base of the apparatus and another leg 50b depending angularly with respect to centerline CL to form a portion of the handle of the apparatus. A plurality of fingers 52 have base end attached to leg 50a and free ends. Fingers 52 extend radially away from centerline CL and also extend in a uniform axial direction with respect to centerline CL so as to form, with leg 50a, a generally cup-like member. The fingers 52 are substantially straight and are joined by elastic web elements 54. Both fingers 52 and web elements 54 are formed of a relatively flexible natural or synthetic elastomer. The thickness of the fingers 52 gradually lessens from their base ends to their free ends. This facilitates return of the fingers to their original positions after flexing. Web elements 54 are quite thin as compared to fingers 52 as shown in FIG. 10. Thus, the web elements seal the areas between the fingers but do not substantially interfere with proper movement of the fingers. A pad 55 similar to pad 16 of FIGS. 1-7, is removably fastened across the mouth of the cup-like member and over the free ends of the fingers 52 by a drawstring 56.

The end of leg 50b of tube 50 is internally enlarged to telescopically receive one end of a wand 58. The enlarged portion of leg 50b has an internal annular circumferential groove 60 therein which mates with an external annular ridge on the wand 58. The wand 58 can thus be snapped into the tube 50, tube 50 and attached parts thus being permitted to rotate with respect to wand 58 but not to pivot. In use, the wand 58 is used to press the pad 55 against the surface being washed via tube 50 and fingers 52. As the fingers 52 flex to accomodate the various contours of the surface, the pad is caused to more closely conform to these contours to effect a more thorough scrubbing action.

It will be appreciated that many modifications of the preferred embodiments described above can be made without departing from the scope of the invention. For instance, many parts shown as integrally formed, e.g. the fingers 12 and base 10 of FIGS. 1-7, could be formed separately and then attached. Likewise, if no movement of the base relative to the handle is desired, the wand could be made integral with or rigidly attached to the tube 50 or extension 14. The pad could also be permanently attached to the fingers if desired. Another modification might involve attachment of the wand to the adjacent tube 50 or extension 14 so as to allow pivotal movement but not rotation. Accordingly, it is intended that the scope of the invention be limited only by the claims which follow.

I claim:
1. Scrubbing apparatus comprising:
   a base;
   a plurality of flexible, resilient fingers each having a base end adjoining said base and a free end, each of said fingers extending generally radially away from a finger centerline and also extending generally axially with respect to said centerline in a uniform direction;
   and a pad member connected to the free ends of said fingers to be urged by said fingers against an object to be scrubbed and permitting relative distension of said fingers.

2. The apparatus of claim 1 further comprising a handle adjoining said base and wherein said fingers and said base together generally define a cup-like member having a mouth opening generally away from said handle, said pad member extending across the mouth of said cup-like member.

3. The apparatus of claim 2 further comprising a plurality of web elements, a respective one of said web elements being disposed between and connected to each pair of adjacent ones of said fingers, wherein said fingers are curved, and wherein said pad member is elastic.

4. The apparatus of claim 1 wherein said pad is removable.

5. The apparatus of claim 2 wherein said base has an opening therethrough communicating with the interior of said cup-like member, and wherein said handle comprises a tube having a flowway therethrough and having a first end adjoining said base with said flowway in communication with said passageway and a second end adapted for connection to a fluid source, said apparatus further comprising means permitting movement of said base with respect to at least a portion of said handle while allowing free flow of fluid from said flowway to the interior of said cup-like member.

* * * * *